(12) United States Patent
Jeung et al.

(10) Patent No.: US 9,454,850 B2
(45) Date of Patent: Sep. 27, 2016

(54) MOBILE COMMUNICATION TERMINAL FOR PROVIDING AUGMENTED REALITY SERVICE AND METHOD OF CHANGING INTO AUGMENTED REALITY SERVICE SCREEN

(71) Applicant: Samsung Electronics Co. Ltd., Suwon-si, Gyeonggi-do (KR)

(72) Inventors: Ji-Hong Jeung, Seoul (KR); Gong-Wook Lee, Suwon-si (KR); Sung-Hwan Baek, Suwon-si (KR); Jun-Ho Lee, Suwon-si (KR); Kyu Sung Cho, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 479 days.

(21) Appl. No.: 13/909,841

(22) Filed: Jun. 4, 2013

(65) Prior Publication Data
US 2013/0328929 A1 Dec. 12, 2013

(30) Foreign Application Priority Data

Jun. 6, 2012 (KR) .......................... 10-2012-0060678

(51) Int. Cl.
| | |
|---|---|
| *G09G 5/00* | (2006.01) |
| *G06T 19/00* | (2011.01) |
| *G06F 1/16* | (2006.01) |
| *G06F 3/01* | (2006.01) |
| *G09B 29/10* | (2006.01) |
| *G09B 29/00* | (2006.01) |

(Continued)

(52) U.S. Cl.
CPC ........... *G06T 19/006* (2013.01); *G01C 21/206* (2013.01); *G01C 21/3638* (2013.01); *G06F 1/1626* (2013.01); *G06F 1/1694* (2013.01); *G06F 3/011* (2013.01); *G06F 3/017* (2013.01); *G09B 29/008* (2013.01); *G09B 29/106* (2013.01); *G06F 2200/1637* (2013.01)

(58) Field of Classification Search
None
See application file for complete search history.

(56) References Cited

U.S. PATENT DOCUMENTS

| | | | |
|---|---|---|---|
| 2010/0123737 A1* | 5/2010 | Williamson | ....... G01C 21/3647 345/672 |
| 2010/0225756 A1 | 9/2010 | Miyata | |
| 2011/0221656 A1* | 9/2011 | Haddick | .............. G02B 27/017 345/8 |

(Continued)

FOREIGN PATENT DOCUMENTS

| | | |
|---|---|---|
| JP | H09311625 A | 12/1997 |
| JP | 2005025116 A | 1/2005 |

(Continued)

OTHER PUBLICATIONS

"Nokia Launch City Lens Augmented Reality Application", https://www.youtube.com/watch?v=mlO9pDYB0zY May 9, 2012, section from minute 1:25" to 1:32".

*Primary Examiner* — Peter Hoang
(74) *Attorney, Agent, or Firm* — Jefferson IP Law, LLP

(57) ABSTRACT

A method of changing into a screen of an Augmented Reality (AR) service in a mobile communication terminal including a camera is provided. The method of changing into a screen of an AR service in a mobile communication terminal includes displaying a prior screen different from an AR service screen, detecting a predetermined event to change display of the prior screen to the AR service screen, driving the camera if the predetermined event has been detected, capturing an image using the camera, and displaying the AR service screen rendered based on the image captured by the camera.

11 Claims, 14 Drawing Sheets

(51) Int. Cl.
*G01C 21/20* (2006.01)
*G01C 21/36* (2006.01)

(56) References Cited

U.S. PATENT DOCUMENTS

| | | |
|---|---|---|
| 2011/0273473 A1 | 11/2011 | Kim |
| 2011/0313653 A1* | 12/2011 | Lindner ............. G01C 21/3632 |
| | | 701/523 |
| 2012/0038668 A1 | 2/2012 | Kim et al. |
| 2012/0046071 A1 | 2/2012 | Brandis et al. |
| 2012/0089950 A1* | 4/2012 | Tseng ................... G06F 3/0484 |
| | | 715/854 |
| 2013/0088514 A1* | 4/2013 | Breuss-Schneeweis G06T 19/006 |
| | | 345/633 |
| 2013/0231861 A1 | 9/2013 | Yokoyama et al. |
| 2013/0321461 A1* | 12/2013 | Filip ....................... G06F 3/011 |
| | | 345/632 |
| 2013/0325321 A1* | 12/2013 | Pylappan ........... G01C 21/3638 |
| | | 701/420 |

FOREIGN PATENT DOCUMENTS

| | | |
|---|---|---|
| JP | 2006349964 A | 12/2006 |
| KR | 10-0582349 B1 | 5/2006 |
| KR | 10-2011-0139791 A | 12/2011 |
| WO | 2012066668 A1 | 5/2012 |

* cited by examiner

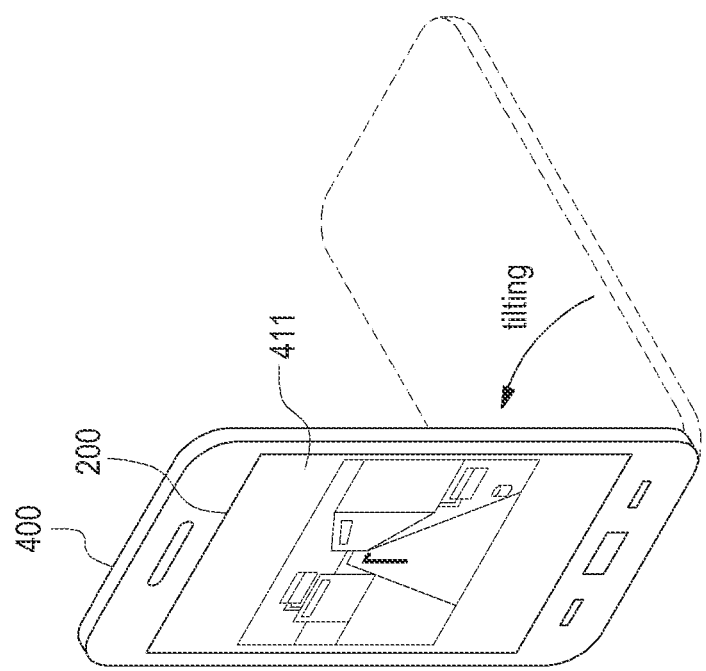
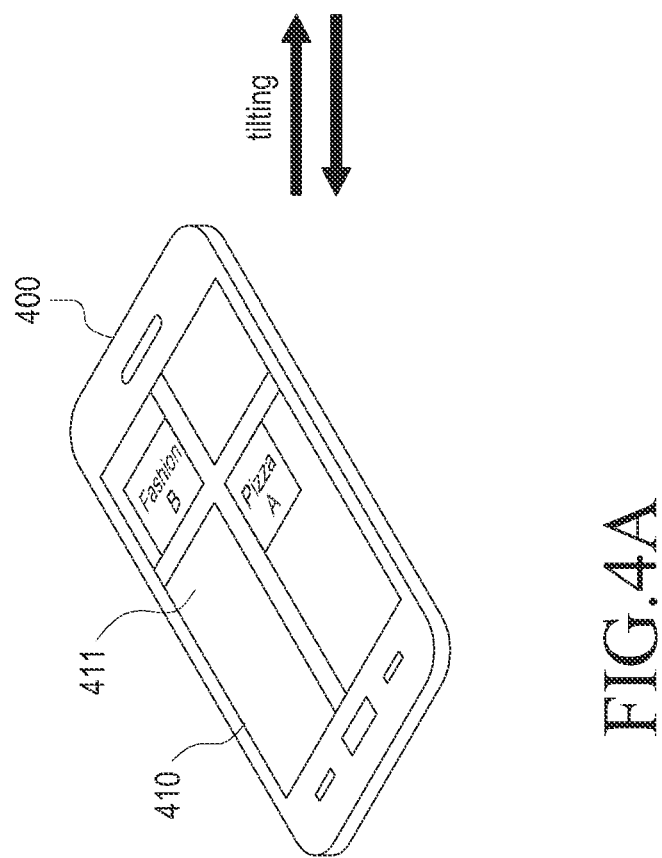
FIG.4A
FIG.4B

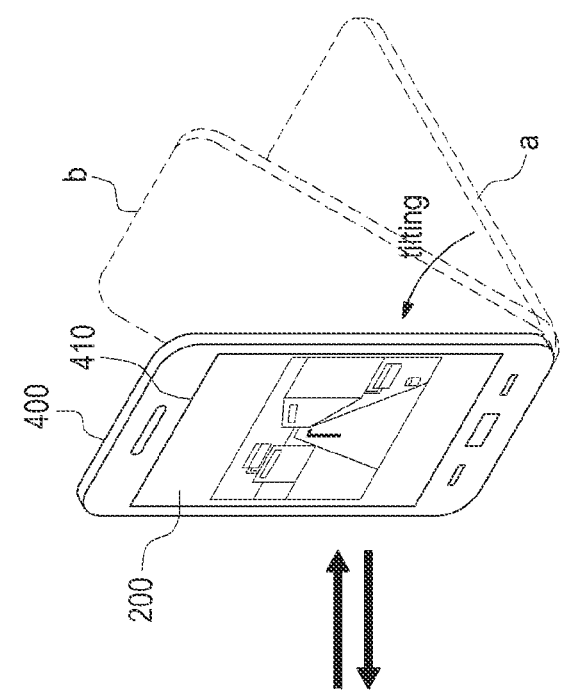
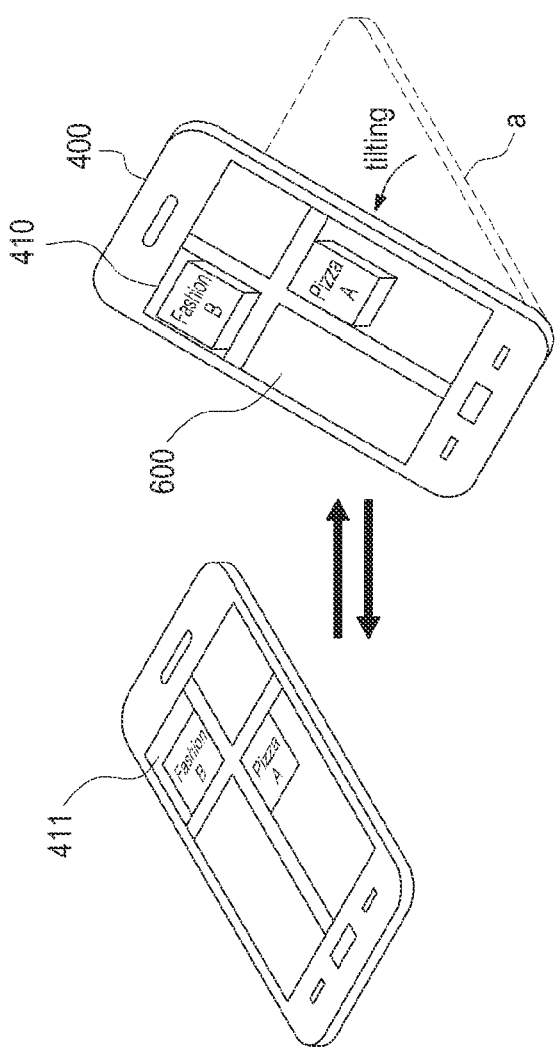
FIG.6A  FIG.6B  FIG.6C

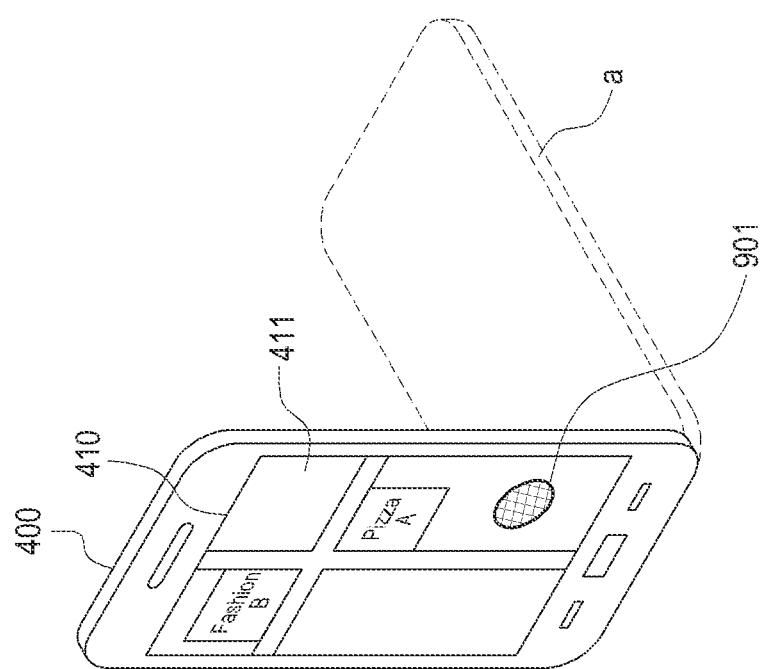
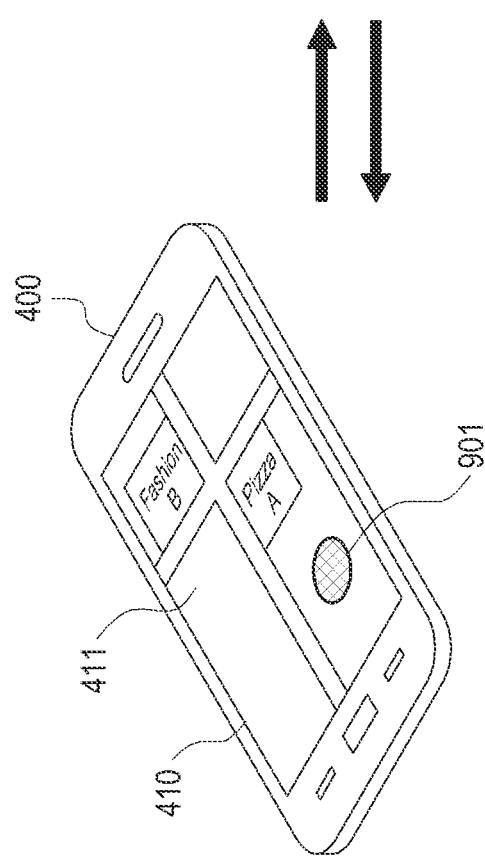
FIG.9A
FIG.9B

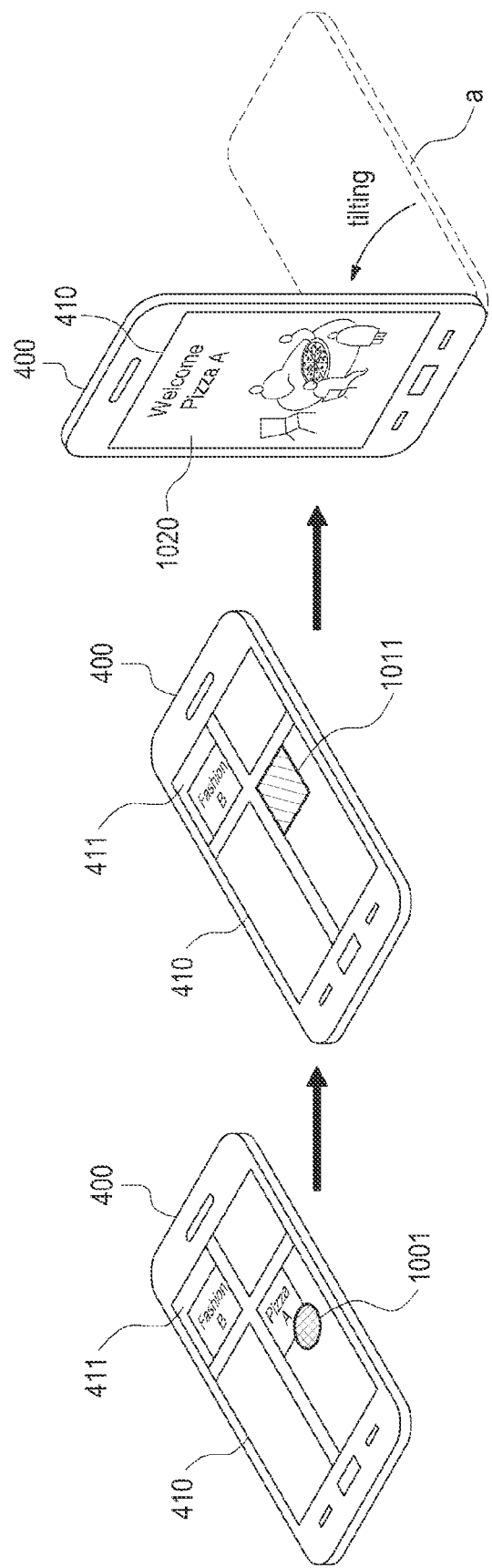

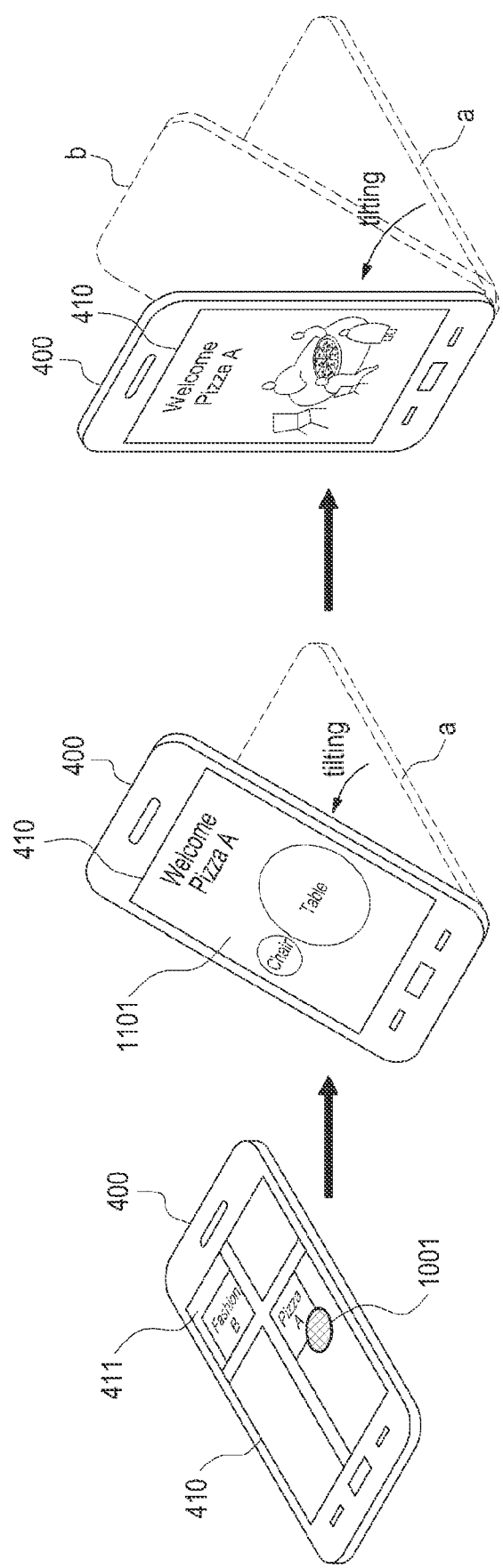

MOBILE COMMUNICATION TERMINAL FOR PROVIDING AUGMENTED REALITY SERVICE AND METHOD OF CHANGING INTO AUGMENTED REALITY SERVICE SCREEN

PRIORITY

This application claims the benefit under 35 U.S.C. §119 (a) of a Korean patent application filed on Jun. 6, 2012 in the Korean Intellectual Property Office and assigned Serial No. 10-2012-0060678, the entire disclosure of which is hereby incorporated by reference.

BACKGROUND OF THE INVENTION

1. Field of the Invention

The present invention relates to a mobile communication terminal for providing an Augmented Reality (AR) service and method of changing into the augmented reality service screen.

2. Description of the Related Art

These days active research and development is being conducted to provide Augmented Reality (AR) services. In particular, smart phones have emerged as a result of devices being equipped with a camera, a high-performance computing unit, a communication unit, and the like. With the emergence of smart phones, AR is being used more actively. AR services refer to a variety of services to maximize user convenience by displaying augmented information on a real image captured by a camera (e.g., overlaying the augmented information on the real image during display thereof).

For example, an AR service may superimpose received road information onto a real image including a plurality of roads captured by a user with his or her smart phone. As an example, the road information may be received from a server. The smart phone may render the image augmented with the road information, thereby allowing the user to intuitively grasp the road condition (e.g., in which direction a road on the screen stretches).

For example, the AR service may provide reality information, such as a captured real image combined with virtual information, such as road information. In the meantime, AR services according to the related art need a function to run itself. In this regard, the user has to select an icon of a corresponding application from a start screen, such as a menu screen, which may cause inconvenience to the user.

Therefore, a need exists for a method of running an AR service more intuitively. In addition, when an AR service is initially running, a method of changing screens is required to enable the user to more intuitively grasp the running process. For example, a need exists for an apparatus and method for changing to the AR service screen.

The above information is presented as background information only to assist with an understanding of the present disclosure. No determination has been made, and no assertion is made, as to whether any of the above might be applicable as prior art with regard to the present invention.

SUMMARY OF THE INVENTION

Aspects of the present invention are to address at least the above-mentioned problem and/or disadvantages and to provide at least the advantages described below. Accordingly, an aspect of the present invention it to provide a mobile communication terminal for providing an Augmented Reality (AR) service more intuitively and method of changing to an AR service screen.

In accordance with an aspect of the present invention, a method of changing into a screen of an AR service in a mobile communication terminal is provided. The method includes displaying a prior screen different from an AR service screen, detecting a predetermined event to change display of the prior screen to the AR service screen, driving the camera if the predetermined event has been detected, capturing an image using the camera, and displaying the AR service screen rendered based on the image captured by the camera.

In accordance with another aspect of the present invention, a mobile communication terminal for providing an AR service is provided. The mobile communication terminal includes a camera, a touch screen that displays a prior screen different from an AR service screen, an event detector for detecting a predetermined event to change display of the prior screen to the AR service screen, and a controller for driving the camera if the predetermined event has been detected, for capturing an image using the camera, and for controlling the touch screen to display the AR service screen rendered based on the image captured by the camera.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features, and advantages of certain exemplary embodiments of the present invention will be more apparent from the following description taken in conjunction with the accompanying drawings, in which:

FIGS. 4A and 4B illustrate a method of changing to an AR service screen according to an exemplary embodiment of the present invention;

FIGS. 6A to 6C illustrate a method of changing to an AR service screen according to another exemplary embodiment of the present invention;

FIGS. 9A and 9B illustrate screen fixation according to an exemplary embodiment of the present invention;

FIGS. 10A to 10C illustrate a process of providing an indoor image of a building according to an exemplary embodiment of the present invention;

FIGS. 11A to 11C illustrate screen changes according to an exemplary embodiment of the present invention;

Throughout the drawings, like reference numerals will be understood to refer to like parts, components, and structures.

DETAILED DESCRIPTION OF EXEMPLARY EMBODIMENTS

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions may be omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention is provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

As a non-exhaustive illustration only, a terminal (e.g., a mobile communication terminal) described herein may refer to mobile devices such as a cellular phone, a Personal Digital Assistant (PDA), a digital camera, a portable game console, and an MP3 player, a Portable/Personal Multimedia Player (PMP), a handheld e-book, a portable lap-top Personal Computer (PC), a Global Positioning System (GPS) and the like capable of wireless communication or network communication consistent with that disclosed herein.

Figure 1:
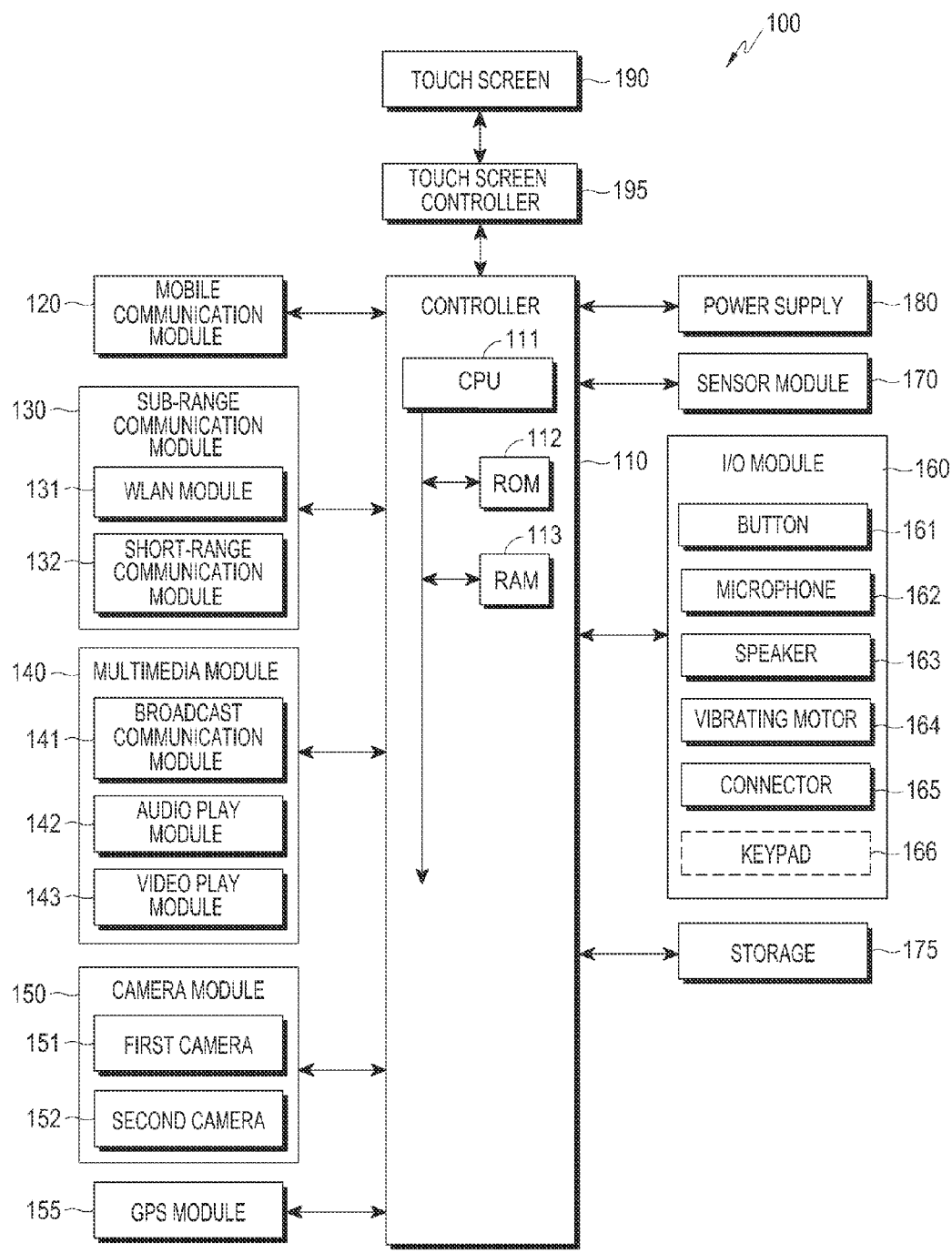
FIG. 1 is a block diagram of a mobile communication terminal with a touch screen according to an exemplary embodiment of the present invention.

FIG. 1 is a block diagram of a mobile communication terminal with a touch screen according to an exemplary embodiment of the present invention.

Referring to FIG. 1, the mobile communication terminal 100 includes a touch screen 190 and a touch screen controller 195. The mobile communication terminal 100 also includes a controller 110, a mobile communication module 120, a sub-communication module 130, a multimedia module 140, a camera module 150, a GPS module 155, an input/output module 160, a sensor module 170, a storage 175, and a power supply 180.

The mobile communication terminal 100 with the touch screen 190 may be connected to an external device (not shown) via the mobile communication module 120, the sub-communication module 130, and/or the connector 165.

The "external device" includes another device, a cell phone, a smart phone, a tablet Personal Computer (PC), and a server, all of which are not shown.

The sub-communication module 130 includes at least one of a Wireless Local Area Network (WLAN) module 131 and a short-range communication module 132.

The multimedia module 140 includes at least one of a broadcast communication module 141, an audio play module 142, and video play module 143.

The camera module 150 includes at least one of a first camera 151 and a second camera 152.

The input/output module 160 includes at least one of a button 161, a microphone 162, a speaker 163, a vibration motor 164, a connector 165, and a keypad 166.

The controller 110 may include a Central Processing Unit (CPU) 111, a Read Only Memory (ROM) 112 for storing a control program to control the mobile device 100, and a Random Access Memory (RAM) 113 for storing signals or data input from an outside or for being used as a memory space for working results in the mobile communication terminal 100. The CPU 111 may include at least one core (e.g., the CPU 11 may include a single core, dual cores, triple cores, or quad cores). The CPU 111, ROM 112, and RAM 113 may be connected to each other via an internal bus.

The controller 110 may control the mobile communication module 120, the sub-communication module 130, the multimedia module 140, the camera module 150, the GPS module, the input/output module 160, the sensor module 170, the storage 175, the power supply 180, the touch screen 190, and the touch screen controller 195. In particular, the controller 100 may detect a predetermined event that corresponds to a screen change or fixation as will be described in more detail below. The controller 110 may also control the touch screen 190 to display the detection results.

The mobile communication module 120 connects the mobile communication terminal 100 to an external device through mobile communication using one or more antennas (not shown) under control of the controller 110. The mobile communication module 120 transmits/receives wireless signals for voice calls, video conference calls, Short Message Service (SMS) messages, or Multimedia Message Service (MMS) messages to/from a cell phone (not shown), a smart phone (not shown), a tablet PC (not shown), or another device, the phones having phone numbers to be entered into the mobile communication terminal 100.

The sub-communication module 130 may include at least one of the WLAN module 131 and the short-range communication module 132. For example, the sub-communication module 130 may include either the WLAN module 131 or the near-field communication module 132, or both.

The WLAN module 131 may be connected to the Internet in a place at which there is an Access Point (AP) (not shown), under control of the controller 110. The WLAN module 131 supports Institute of Electrical and Electronic Engineers' (IEEE's) WLAN standard IEEE802.11x. The short-range communication module 132 may conduct short-range communication between the mobile communication terminal 100 and an image rendering device (not shown) under control of the controller 110. The short-range communication may include Bluetooth, Infrared Data Association (IrDA), and the like.

The mobile communication terminal 100 may include at least one of the mobile communication module 120, the WLAN module 131 and the short-range communication module 132 based on the performance. For example, the mobile communication terminal 100 may include a combination of the mobile communication module 120, the WLAN module 131 and the short-range communication module 132 based on the performance.

The multimedia module 140 may include the broadcast communication module 141, the audio play module 142, or the video play module 143. The broadcast communication module 141 may receive broadcast signals (e.g., television broadcast signals, radio broadcast signals, data broadcast signals, and the like) and additional broadcast information (e.g., Electric Program Guide (EPG) or Electric Service Guide (ESG)) transmitted from a broadcasting station through a broadcast communication antenna (not shown) under control of the controller 110. The audio play module 142 may play digital audio files (e.g., files having extensions, such as mp3, wma, ogg, way, and the like) stored or received under control of the controller 110. The video play module 143 may play digital video files (e.g., files having extensions, such as mpeg, mpg, mp4, avi, move, mkv, and the like) stored or received under control of the controller 110. The video play module 143 may also play digital audio files.

The multimedia module 140 may include the audio play module 142 and the video play module 143 except for the broadcast communication module 141. The audio play module 142 or video play module 143 of the multimedia module 140 may be included in the controller 110.

The camera module 150 may include at least one of the first and second cameras 151 and 152 for capturing still images or video images under control of the controller 110. The camera module 150 may include ether the first camera 151 or the second camera 152, or both. Furthermore, the first or second camera 151 or 152 may include an auxiliary light source (e.g., a flash (not shown), or the like) for providing as much light as needed for capturing images. The first and second cameras 151 and 152 may be arranged adjacent to each other (e.g., the distance between the first and second cameras 151 and 152 may be within the range between 1 to 8 cm), and may capture 3D still images or 3D video images. If the distance between the first and second cameras 151 and 152 is less than a length across a first housing 100a (e.g., perpendicular to a distance D1), the first and second cameras 151 and 152 may be arranged in the front and back of the mobile communication terminal 100, respectively.

The GPS module 155 receives radio signals from a plurality of GPS satellites (not shown) in Earth's orbit, and may calculate the position of the mobile communication terminal 100 by using time of arrival from the GPS satellites to the mobile communication terminal 100.

The input/output module 160 may include at least one of at least one button 161, the microphone 162, the speaker 163, the vibration motor 164, the connector 165, the keypad 166, and the like.

The microphone 162 generates electric signals by receiving voice or sound under control of the controller 110. There may be one or more microphones 162 arranged.

The speaker 163 may output sounds corresponding to various signals (e.g., radio signals, broadcast signals, digital audio files, digital video files, photography signals, or the like) from the mobile communication module 120, sub-communication module 130, multimedia module 140, or camera module 150 to the outside under control of the controller 110. The speaker 163 may output sounds (e.g., button-press sounds or ringback tones) that correspond to functions performed by the mobile communication terminal 100.

The vibration motor 164 may convert an electric signal to a mechanical vibration under control of the controller 110. For example, the mobile communication terminal 100 in a vibrating mode operates the vibrating motor 164 when receiving a voice call from another device (not shown).

According to exemplary embodiments of the present invention, the vibrating motor 164 of the mobile communication terminal 100 may operate in response to touching of the touch screen 190.

The connector 165 may be used as an interface for connecting the mobile communication terminal 100 to the external device (not shown) or a power source (not shown). Under control of the controller 110, data stored in the storage 175 of the mobile communication terminal 100 may be transmitted to the external device via a cable connected to the connector 165, or data may be received from the external device. Power may be received from the power source via a cable connected to the connector 165 or a battery (not shown) may be charged.

The keypad 166 may receive key inputs from the user to control the mobile communication terminal 100. The keypad 166 includes a physical keypad (not shown) formed in the mobile communication terminal 100, or a virtual keypad (not shown) displayed on the touchscreen 190. The mechanical keypad formed in the mobile communication terminal 100 may be excluded depending on the performance or structure of the mobile communication terminal 100.

The sensor module 170 includes at least one sensor for detecting a status of the mobile communication terminal 100. For example, the sensor module 170 may include a proximity sensor for detecting proximity of the user to the mobile communication terminal 100, an illumination sensor for detecting an amount of ambient light, a motion sensor (not shown) for detecting an operation of the mobile communication terminal 100 (e.g., rotation of the mobile communication terminal 100, acceleration or vibration imposed on the mobile communication terminal 100), and the like. At least one sensor may detect the status and generate a corresponding signal to transmit to the controller 110. The sensor of the sensor module 170 may be added or removed depending on the performance of the mobile communication terminal 100. The motion sensor may include at least one of a rotation sensor, a gyro sensor, a linear sensor, and the like. The sensors may be collectively called a sensor unit. As an example, the sensor unit may detect a tilting motion when the mobile communication terminal 100 tilts at a certain angle.

The storage 175 may store signals or data input/output according to operations of the mobile communication module 120, the sub-communication module 130, the multimedia module 140, the camera module 150, the GPS module, the input/output module 160, the sensor module 170, the first touch screen 190 under control of the controller 110. The storage 175 may store the control program for controlling the mobile communication terminal 100 or the controller 110.

The term "storage" implies not only the storage 175, but also the ROM 112 and RAM 113 in the controller 110, or a memory card (not shown) (e.g., an SD card, a memory stick), and the like installed in the mobile device 100. The storage may also include a non-volatile memory, volatile memory, Hard Disc Drive (HDD), or Solid State Drive (SSD).

The power supply 180 may supply power to one or more batteries (not shown) under control of the controller 110. The one or more batteries power the mobile communication terminal 100. The power supply 180 may supply the mobile communication terminal 100 with the power input from the external power source (not shown) via a cable connected to the connector 165.

The touch screen 190 may provide the user with a user interface for various services (e.g., call, data transmission, broadcasting, photography services). The touchscreen 190 may send a signal (e.g., an analog signal) corresponding to at least one touch input to the user interface to the touch-screen controller 195. The touch screen 190 may receive the at least one touch from a user's physical contact (e.g., with fingers including thumb, or the like) or a via a touchable touch device (e.g., a stylus pen). The touchscreen 190 may receive consecutive moves of one of the at least one touch. The touch screen 190 may send a signal (e.g., an analog signal) corresponding to the consecutive moves of the input touch to the touchscreen controller 195.

According to exemplary embodiments of the present invention, touches are not limited to physical touches by a physical contact of the user or contacts with the touchable touch device, but may also include touchless inputs (e.g., keeping a detectable distance less than 1 mm between the touch screen 190 and the user's body or touchable touch device). The detectable distance from the touch screen 190 may vary depending on the performance or structure of the mobile communication terminal 100.

The touch screen 190 may be implemented using a resistive scheme, a capacitive scheme, an infrared scheme, an acoustic wave scheme, or the like.

The touch screen controller 195 converts the analog signal received from the touch screen 190 to a digital signal (e.g., XY coordinates) and transmits the digital signal to the controller 110. The controller 110 may control the touch screen 190 by using the digital signal received from the touch screen controller 195. For example, in response to the touch, the controller 110 may enable a shortcut icon (not shown) displayed on the touchscreen 190 to be selected or to be executed. The touch screen controller 195 may also be incorporated in the controller 110.

Figure 2:
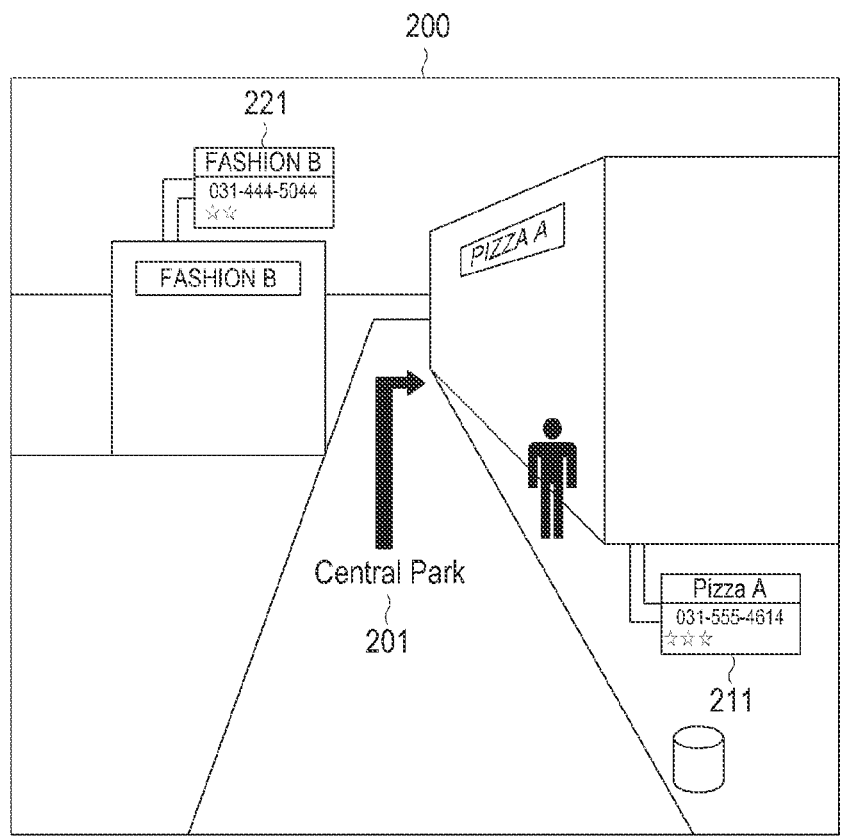
FIG. 2 illustrates a screen of an Augmented Reality (AR) service according to an exemplary embodiment of the present invention.

FIG. 2 illustrates a screen of an Augmented Reality (AR) service according to an exemplary embodiment of the present invention.

Referring to FIG. 2, a screen 200 of an AR service displays images captured by the camera module 150 of the mobile communication terminal 100 with different pieces of augmented information 201, 211, and 221. The augmented information may correspond to directional information 201 of a road, information 211 and 221 about shop names, contacts, ratings of surrounding buildings, and the like.

The mobile communication terminal 100 may send images captured by the camera module 150, the mobile communication terminal's Global Positioning System (GPS) information, or the like to a server. The server may read out different pieces of augmented information from a database regarding the AR service and send the augmented information to the mobile communication terminal. Thereafter, the mobile communication terminal 100 may display the screen 200 of an AR service by rendering the captured images with the augmented information. The server may also send a result of rendering the captured image and the augmented information to the mobile communication terminal, so that the mobile communication terminal may display a screen 200 of the rendered AR service.

As an example, the screen 200 of an AR service displays a road in the center with a piece of the augmented information 201 that indicates that the road leads to "Central Park" if the mobile communication terminal 100 proceeds and turns right. On the right of the screen 200 of the AR service, a building next to the road is captured and displayed with pieces of the augmented information 211 of the building, such as a shop name "Pizza A", contact information "031-555-4614" (e.g., a telephone number), and a three-star rating. On the left of the screen 200 of the AR service, a building next to the road is captured and displayed with pieces of the augmented information 221 of the building, such as a shop name "FASHION B", contact information "031-444-5044", and a two-star rating.

The screen 200 of the AR service is by way of example only, and images represented in the screen 200 are not limited thereto, but may also include many different kinds of images, including indoor views of surrounding buildings, aerial views of the two dimensional map, street views, or the like.

Figure 3:
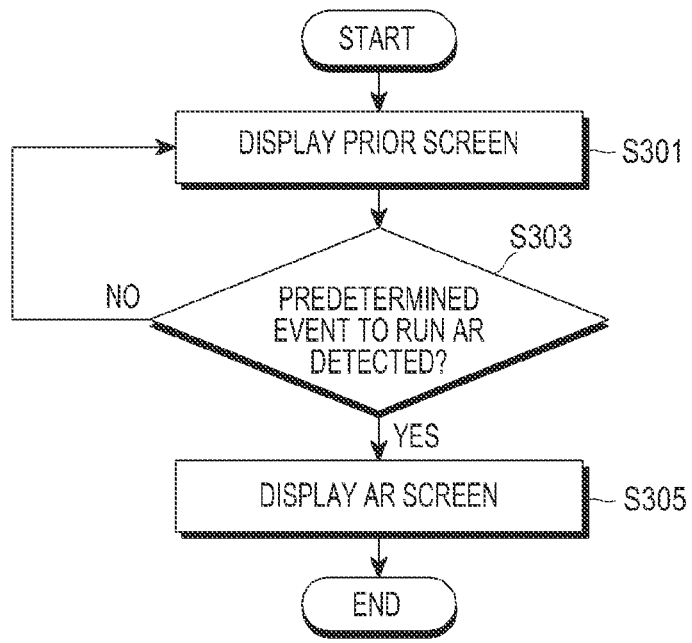
FIG. 3 is a flowchart illustrating a method of changing to an AR service screen according to an exemplary embodiment of the present invention.

FIG. 3 is a flowchart illustrating a method of changing to a screen of the AR service screen according to an exemplary embodiment of the present invention.

Referring to FIG. 3, the mobile communication terminal may display a two dimensional prior screen different from a screen of the AR service (also called an AR service screen), in step S301. The term 'prior screen' refers to any screen displayed on the mobile communication terminal before there is a change to the AR service screen. The prior screen may be a two dimensional map of the user's (i.e., the mobile communication terminal's) surroundings. The prior screen may also be a screen ready for image or video capture, after a camera application is executed. Although displaying any image in the current screen, the mobile communication terminal may immediately change to the AR service screen upon detection of a particular event.

The mobile communication terminal may detect a predetermined event to change to the AR service screen, in step S303. If the mobile communication terminal does not detect the predetermined event in step S303, then the mobile communication terminal returns to step S301 in which the mobile communication terminal may continue to display the prior screen. Otherwise, if the mobile communication terminal detects the predetermined event, then the mobile communication terminal proceeds to step S305 in which the mobile communication terminal may drive the camera module 150 and display the AR service screen rendered based on images captured by the camera module 150. As described above, although displaying any other application screen, the mobile communication terminal may immediately change into the AR service screen as soon as the predetermined event is detected. For example, the mobile communication terminal may drive the camera module 150 when a particular event occurs. The mobile communication terminal may obtain captured images required for the AR service screen from the camera module 150. The mobile communication terminal may display the AR service screen by rendering the captured images with augmented information or by receiving a rendered AR service screen from a server.

FIGS. 4A and 4B illustrate a method of changing to an AR service screen according to an exemplary embodiment of the present invention.

Referring to FIGS. 4A and 4B, the prior screen may be a two dimensional map 411 of the user's or a mobile communication terminal's 400 surroundings. The user may run a map-related application stored in the mobile communication terminal 400 or may operate the mobile communication terminal 400 to access a website that provides web browser-based two dimensional map. As illustrated in FIG. 4A, the mobile communication terminal 400 may display the two dimensional map 411 on a touch screen 410.

According to exemplary embodiments of the present invention, a predetermined event for changing a screen to an AR service screen may correspond to tilting the mobile communication terminal 400. For example, a predetermined event to change screens may be tilting the mobile communication terminal 400 at more than a predetermined angle. For example, as illustrated in FIG. 4B, when the user tilts the mobile communication terminal 400 at more than the predetermined angle, the mobile communication terminal 400 may determine that a predetermined event has occurred.

The mobile communication terminal 400 may then drive the camera module 150 and display the AR service screen 200 on the touch screen 410 based on captured images by the camera module 150.

According to exemplary embodiments of the present invention, the user may move (e.g., orient) the mobile communication terminal 400 back to the first position as shown in FIG. 4A (e.g., by tilting the mobile communication terminal 400 in the opposite direction). In response, the mobile communication terminal 400 may determine the tilting motion in the opposite direction as an inverse screen change event, and accordingly display the prior screen (e.g., the two dimensional map 411). For example, if the mobile communication terminal 400 determines that the orientation thereof is changed according to another predetermined event (e.g., oriented or moved in an opposite direction to the orientation or movement which invokes display of the AR service screen 200), then the mobile communication terminal 400 may automatically display the prior screen (e.g., the mobile communication terminal 400 may revert back to displaying the prior screen).

As described above, the user may be given the AR service screen 200 with the motion of tilting the mobile communication terminal 400. If the user wishes to finish displaying the AR service screen 200, the user may tilt the mobile communication terminal 400 in the opposite direction and then be given the two dimensional map 411. With the above configuration, the user convenience may be maximized when there is a need for alternating between use of the two dimensional map and the AR service. Furthermore, the user may perform an operation that conforms to the user's intuition, such as raising the two dimensional plane in a perpendicular direction to expand to the three dimensional AR, thereby creating an effect of running the AR service without difficulty.

Figure 5:
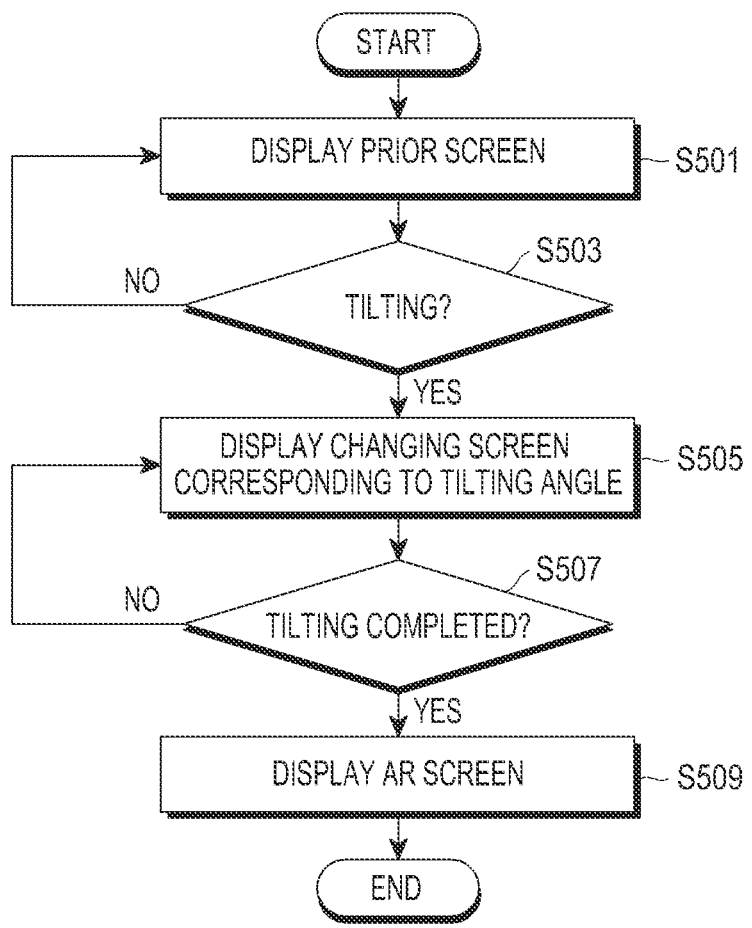
FIG. 5 is a flowchart illustrating a method of changing to an AR service screen according to another exemplary embodiment of the present invention.

FIG. 5 is a flowchart illustrating a method of changing to an AR service screen according to another exemplary embodiment of the present invention.

Referring to FIG. 5, in step S501, the mobile communication terminal 400 may display a prior screen. The prior screen may be a two dimensional map and the event to change screens may be tilting the mobile communication terminal as illustrated in FIGS. 4A and 4B.

In step S503, the mobile communication terminal 400 may determine whether the mobile communication terminal 400 is in the process of tilting. More specifically, when the mobile communication terminal 400 detects a tilting motion, the mobile communication terminal 400 may determine whether the mobile communication terminal 400 has tilted at more than a predetermined angle. For example, in step S503, if the mobile communication terminal 400 determines that the mobile communication terminal 400 has tilted at less than the predetermined angle, the mobile communication terminal 400 may determine that the mobile communication terminal 400 is in the process of tilting in step S503. If the mobile communication terminal 400 does not detect the tilting motion, then the mobile communication terminal 400 may determine that it is not in the process of tilting. The mobile communication terminal 400 being in the process of tilting corresponds to the mobile communication terminal 400 being tilted but not to such an extent that the tilt of the mobile communication terminal 400 has reached the predetermined angle.

If the mobile communication terminal 400 determines that the mobile communication terminal 400 is in the process of tilting in step S503, the mobile communication terminal 400 proceeds to step S505 in which the mobile communication terminal 400 may display at least one changing screen that corresponds to the tilting angle. The at least one changing screen is different from the prior screen or the AR service screen. The changing screen is displayed in the process of changing from the prior screen to the AR service screen, which helps the user recognize the changing process (e.g., from the prior screen to the AR service screen) more intuitively. The mobile communication terminal 400 may display the changing screen based on data received from a server or stored in the mobile communication terminal 400.

The changing screen may be three dimensional aerial view of the two dimensional map as will be described in more detail later with reference to FIGS. 6A to 6C. The aerial view may be an aerial map obtained by viewing the two dimensional map from a certain viewing angle in the air (e.g., viewing the two dimensional map from above). As the user tilts the mobile communication terminal 400, the two dimensional map turns to the three dimensional aerial view, giving a visual effect of obtaining the AR service screen.

In step S507, the mobile communication terminal 400 may determine whether the tilting process has been completed. If the mobile communication terminal 400 determines that the tilting process has not been completed in step S507, the mobile communication terminal 400 proceeds to step S505 in which the mobile communication terminal 400 may display changing screens. Specifically, the mobile communication terminal 400 may display the changing screens by shifting through the changing screens. For example, as the tilting angle increases, the mobile communication terminal 400 may display the changing screens from a screen obtained by being viewed from a lower viewing angle in the air to a screen obtained by being viewed from a higher viewing angle in the air.

In contrast, if the mobile communication terminal 400 determines that the tilting process has been completed in step S507, the mobile communication terminal 400 proceeds to step S509 in which the mobile communication terminal 400 may display the AR service screen.

FIGS. 6A to 6C illustrate a method of changing to an AR service screen according to an exemplary embodiment of the present invention.

Referring to FIG. 6A, the mobile communication terminal 400 is illustrated as displaying the two dimensional map 411 on its touch screen 410 as shown in FIG. 4A. The user may tilt the mobile communication terminal 400.

Referring to FIG. 6B, the mobile communication terminal 400 is illustrated as displaying a changing screen 600. As illustrated in FIG. 6B, when the mobile communication terminal 400 has been tilted at less than a predetermined angle (e.g., an angle measured between position 'a' and the current orientation or position of the mobile communication terminal 400), the mobile communication terminal 400 may determine that the mobile communication terminal 400 is in the process of tilting. The mobile communication terminal 400 may display the changing screen 600 in the process of tilting. The changing screen 600 may be a three dimensional aerial view that corresponds to the two dimensional map 411, which will be described in more detail below with reference to FIG. 7.

According to exemplary embodiments of the present invention, as the tilting angle increases, aerial views obtained with higher viewing angles in the air may be provided. Accordingly, while the mobile communication terminal 400 is tilting, aerial views with gradually increasing viewing angles in the air may give an animation effect. The mobile communication terminal 400 may receive aerial views with different viewing angles from a server. The mobile communication terminal 400 may receive the aerial views with different viewing angles from the server substantially concurrently with the display of the map (e.g., the two dimensional map 411), or the mobile communication terminal 400 may receive aerial views with different viewing angles from a server for a relatively larger geographic area. Such information may be stored locally on the mobile communication terminal 400.

Referring to FIG. 6C, the user may tilt the mobile communication terminal 400 at more than a predetermined angle. In response to mobile communication terminal 400 being tilted at more than the predetermined angle (e.g., when the mobile communication terminal is tilted more than an angle between position 'b' and position 'a'), the mobile communication terminal 400 may display the AR service screen 200.

In contrast, the user may tilt the mobile communication terminal 400 in the opposite direction of the forward tilting direction (e.g., the tilting direction which leads the mobile communication terminal 400 to display the AR screen 200 if tilted beyond the predetermined angle), which operates the mobile communication terminal 400 to display back the two dimensional map 411. In this case, the mobile communication terminal 400 may display at least one changing screen 600. The changing screens may be displayed in the reverse order of the forward tilting.

Accordingly, while the mobile communication terminal 400 is tilting before two dimensional map 411 is changed into the AR service screen 200, an animation effect may be created with the changing screens, thus providing a service conforming more to the user intuition.

Figure 7:
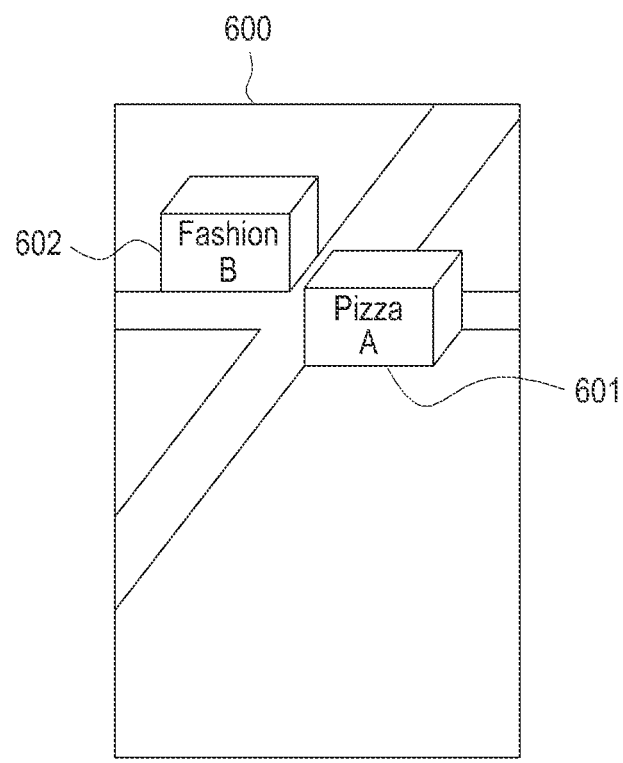
FIG. 7 illustrates a changing screen according to an exemplary embodiment of the present invention.

FIG. 7 illustrates a changing screen according to an exemplary embodiment of the present invention.

Referring to FIG. 7, the changing screen 600 may be a three dimensional aerial view obtained by viewing the two dimensional map 411 from a particular viewing angle in the air. In the three dimensional aerial view, surrounding buildings 601 and 602 are provided as three dimensional images. The viewing angle may vary and a plurality of aerial views with different viewing angles that correspond to tilting angles may be provided as changing screens.

Figure 8A:
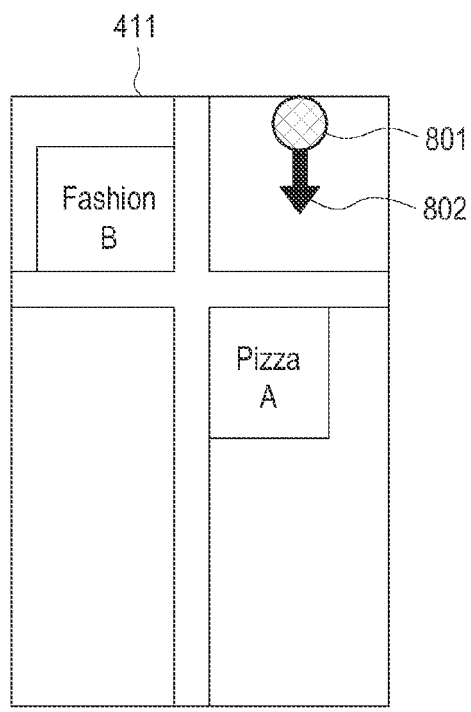
FIGS. 8A and 8B illustrate a concept to provide an AR service screen according to an exemplary embodiment of the present invention.
Figure 8B:
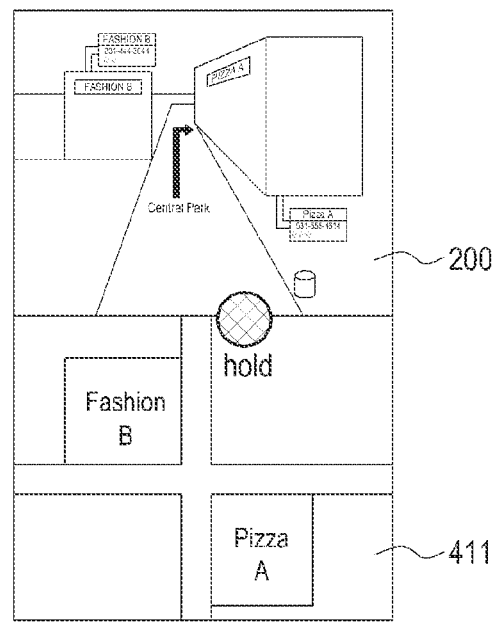

FIGS. 8A and 8B illustrate a concept to provide an AR service screen according to an exemplary embodiment of the present invention.

Referring to FIGS. 8A and 8B, a predetermined event to change to an AR service screen may correspond to a dragging motion downward 802 from the top 801 of the touch screen. Upon detection of the dragging motion, the mobile communication terminal 400 may display the two dimensional map 41, (e.g., the prior screen) and the AR service screen 200 together. For example, on the touch screen 410, the prior screen 411 may be displayed in the lower part of the touch screen and the AR service screen 200 may be displayed in the upper part. For example, the AR service screen 200 and the prior screen 411 may be tiled on the touch screen. Even in this case, the mobile communication terminal 400 may drive the camera module 150. Providing the user with the prior screen 411 and the AR service screen 200 at the same time may maximize the user convenience. The prior screen 411 and the AR service screen 200 may have a line of boundary running across the touch screen 410 through a hold input point, and the boundary may vary according to a change of the hold input point. Portions of the prior screen 411 and the AR service screen 200 may be adjustable.

Arrangement of the prior screen 411 and the AR service screen 200 are by way of example only, and it will be obvious to the ordinary skill in the art that the arrangement may be reversed from the arrangement illustrated in FIG. 8B. Furthermore, it will be appreciated that the AR service screen 200 may not be limited to what were described above, such as two dimensional maps, three dimensional aerial views, surrounding buildings' indoor images, surrounding buildings' external images, etc.

FIGS. 9A and 9B illustrates screen fixation according to an exemplary embodiment of the present invention.

Referring to FIGS. 9A and 9B, the user may touch and hold a point 901 on the touch screen 410 and then tilt the mobile communication terminal 400. The mobile communication terminal 400 may determine such a touch and hold to be a screen fixation event, and accordingly does not perform screen changes even if the mobile communication terminal 400 is tilted. For example, the mobile communication terminal 400 may continue to display the prior screen 411 even when the mobile communication terminal 400 is tilted (e.g., oriented or moved from position 'a') if a touch and hold event is detected. Although not shown, the mobile communication terminal 400 may touch and hold a point on the touch screen 410 while displaying an AR service screen. The mobile communication terminal 400 may then determine the touch and hold input to be the screen fixation event and continue to display the AR service screen.

FIGS. 10A to 10C illustrate a process of providing an indoor image of a building according to an exemplary embodiment of the present invention.

Referring to FIGS. 10A and 10B, the user may select one place of interest 1001 (e.g., one of a plurality of surrounding buildings) on the two dimensional map 411 displayed on the touch screen 410. In this case, as illustrated in FIG. 10B, the selected place of interest (e.g., building) may be activated 1011. Then, the user may tilt the mobile communication terminal 400 with the two dimensional map 411 displayed, in which the building 1001 is activated 1011.

Referring to FIG. 10C, when the mobile communication terminal 400 is tilted from position 'a', the mobile communication terminal 400 may provide detailed information (e.g., an indoor image) 1020 of the selected place of interest (building), as shown in FIG. 10C. For example, as illustrated in FIG. 10C, the user may see the indoor image of the selected building "Pizza A" displayed on the touch screen 410.

In contrast, when the mobile communication terminal 400 determines that the mobile communication terminal 400 is inside a building (e.g., the building "Pizza A"), the mobile communication terminal 400 may also display the indoor image 1020 of the building. The mobile communication terminal 400 may determine whether the mobile communication terminal 400 is located inside or outside of a building using received information (e.g., GPS coordinates, or Wireless Fidelity (Wi-Fi) signals, and the like).

FIGS. 11A to 11C illustrate screen changes according to an exemplary embodiment of the present invention.

Referring to FIG. 11A, the user may tilt the mobile communication terminal 400 with the two dimensional map 411 displayed on the touch screen 410. According to exemplary embodiments of the present invention, the user (e.g., the mobile communication terminal 400) may be assumed to be inside a building (e.g., "Pizza A"). For example, the mobile communication terminal 400 may determine that the mobile communication terminal 400 is located inside the building based on received information or based on information provided by sensors on the mobile communication terminal 400.

Referring to FIG. 11B, when the mobile communication terminal 400 is assumed to be located inside a building, the mobile communication terminal 400 may provide a changing screen 1101. The changing screen 1101 may be an indoor plan view or indoor aerial view of the building "Pizza A". The changing screen 1101 may also provide other information relating to the services provided at the location of the mobile communication terminal 400 (e.g., a menu, hours of operation, and the like).

Referring to FIG. 11C, if the mobile communication terminal 400 is tilted at more than a predetermined angle (e.g., if the mobile communication terminal 400 is tiled beyond position 'b' away from position 'a'), the mobile communication terminal 400 may display the indoor image 1020 of the building.

Figures 12A, 12B:
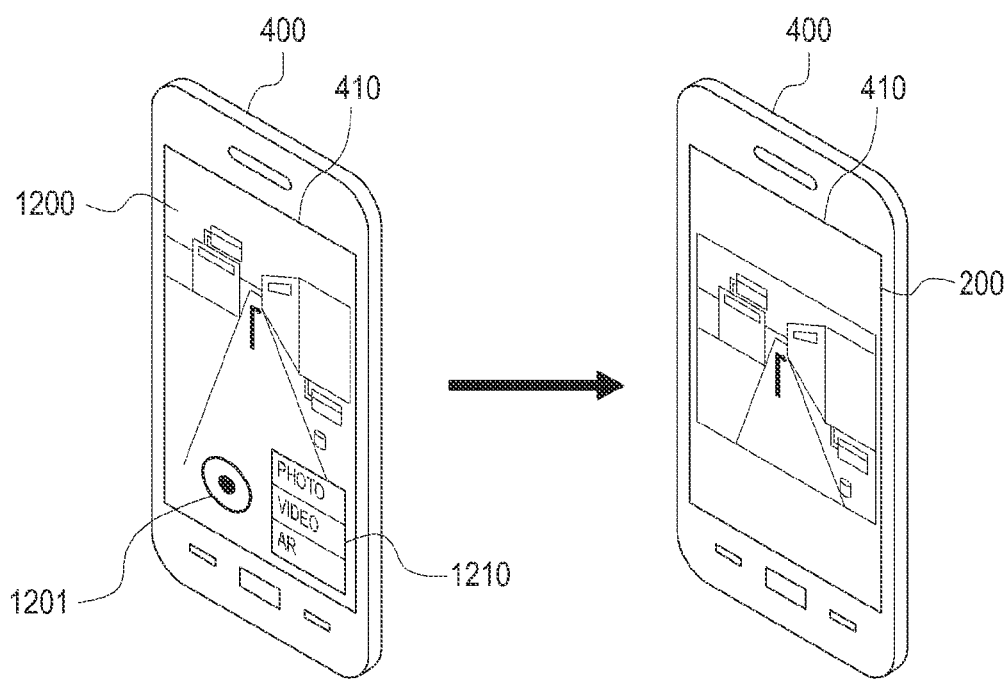
FIGS. 12A and 12B illustrate screen changes according to an exemplary embodiment of the present invention.

FIGS. 12A and 12B illustrate screen changes according to an exemplary embodiment of the present invention.

Referring to FIGS. 12A and 12B, a prior screen may be a screen ready for camera capturing. The mobile communication terminal 400 may display an image 1200 captured by the camera module 150 together with a capture start icon 1201 and a menu settings window 1210 on the touch screen 410. As an example, the menu settings window 1210 has tabs (e.g., buttons) with which a user may select photo, video, AR services, and the like.

As illustrated in FIG. 12B, if the user selects the AR service tab, the mobile communication terminal 400 may display the AR service screen 200.

Figures 13A, 13B:
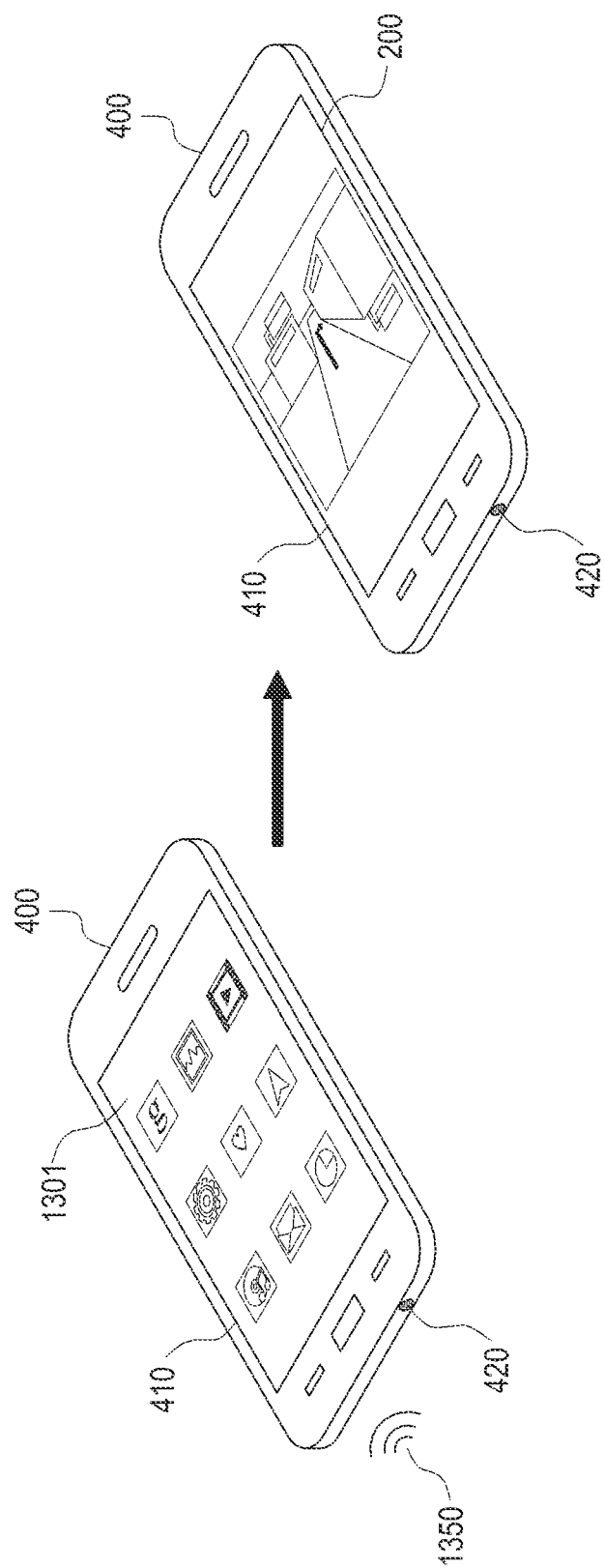
FIGS. 13A and 13B illustrate a method of changing screens according to an exemplary embodiment of the present invention.

FIGS. 13A and 13B illustrate a method of changing screens according to an exemplary embodiment of the present invention.

Referring to FIGS. 13A and 13B, a prior screen displayed on the touch screen 410 may be a start menu screen 1301. A predetermined event to change into an AR service screen 200 may be a voice input 1350 that instructs a change into the AR service screen 200. When receiving the voice input 1350 through a microphone 420, the mobile communication terminal 400 may display the AR service screen 200, as shown in FIG. 13B.

Figure 14B:
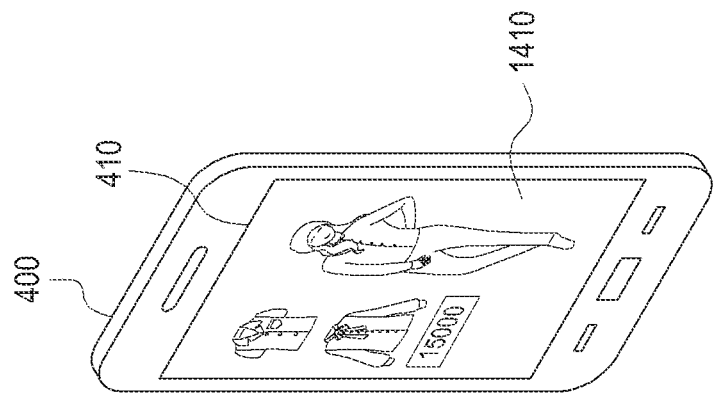
FIGS. 14A and 14B illustrate a method of changing screens according to an exemplary embodiment of the present invention.
Figure 14A:
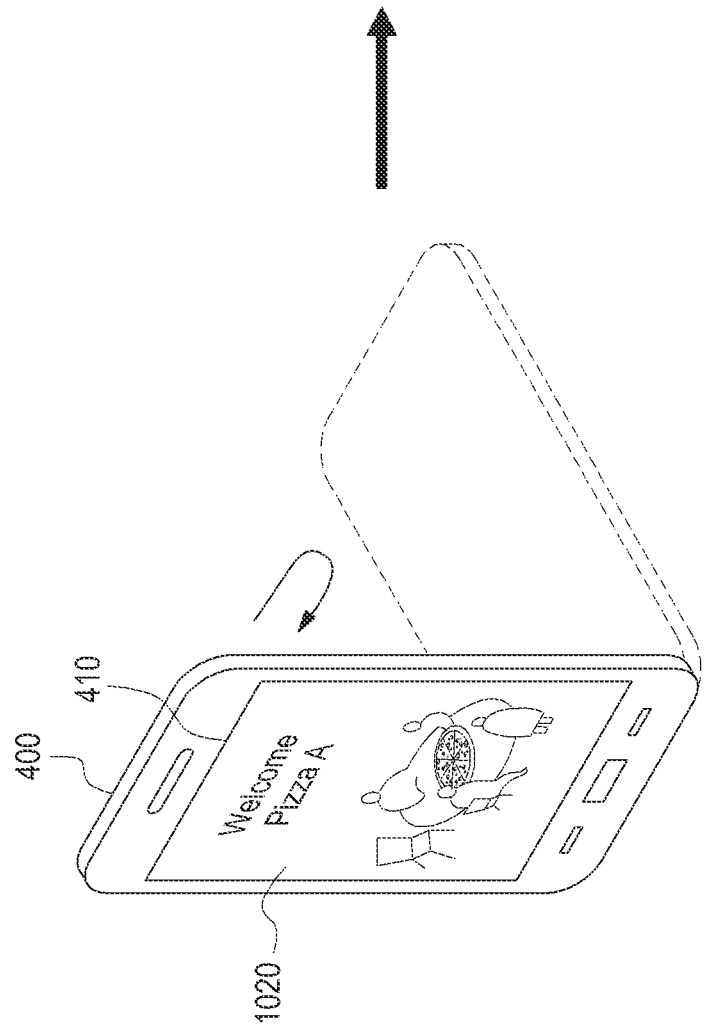

FIGS. 14A and 14B illustrate a method of changing screens according to an exemplary embodiment of the present invention.

Referring to FIGS. 14A and 14B, the mobile communication terminal 400 may display the indoor image 1020 of a surrounding building "Pizza A" on the touch screen 410.

According to exemplary embodiments of the present invention, the predetermined event for chancing to an AR service screen 200 may correspond to a first tilting motion in a first direction followed (e.g., immediately or within a predetermined time) by a second tilting motion in a second direction. The second direction may be a direction opposite to the first direction. For example, the user may conduct a first tilting motion and then conduct a second tilting motion with the mobile communication terminal 400 in an opposite direction of the first tilting motion. More specifically, the user may conduct the first tilting motion with the mobile communication terminal 400 at more than a predetermined angle and then conduct the second tilting motion at more than the predetermined angle in the opposite direction of the first tilting motion.

The mobile communication terminal 400 may change and display an indoor image of a first surrounding building to an indoor image of a second surrounding building, corresponding to the first and second tilting motions. For example, the mobile communication terminal 400 may change and display the indoor image 1020 of the building "Pizza A" to the indoor image 1410 of the building "FASHION B". Although not shown, the indoor image 1410 of the building "FASHION B" may be displayed with the two dimensional map in which the building "FASHION B" is activated. With the configuration, the user may easily and conveniently change and compare indoor images of surrounding buildings on the map.

The indoor images 1020 and 1410 of surrounding buildings illustrated in the exemplary embodiment of the present invention illustrated in FIGS. 14A and 14B are by way of example only. According to exemplary embodiments of the present invention, the mobile communication terminal 400 may change and display outer images of the surrounding buildings or three dimensional aerial views, corresponding to the first and second tilting motions. According to exemplary embodiments of the present invention, the mobile communication terminal 400 may change and display route guidance to the first surrounding building to route guidance into the second surrounding building, corresponding to the first and second tilting motions.

According to exemplary embodiments of the present invention, the mobile communication terminal 400 may change an indoor image of a surrounding building to its outer image, and upon reception of the first and second tilting motions again, change and display the outer image of the building to a three dimensional aerial view.

Figure 15A:
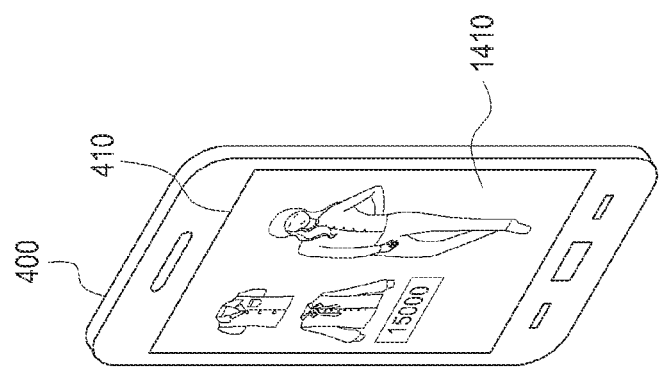
FIGS. 15A to 15C illustrate a method of changing screens according to an exemplary embodiment of the present invention.
Figure 15B:
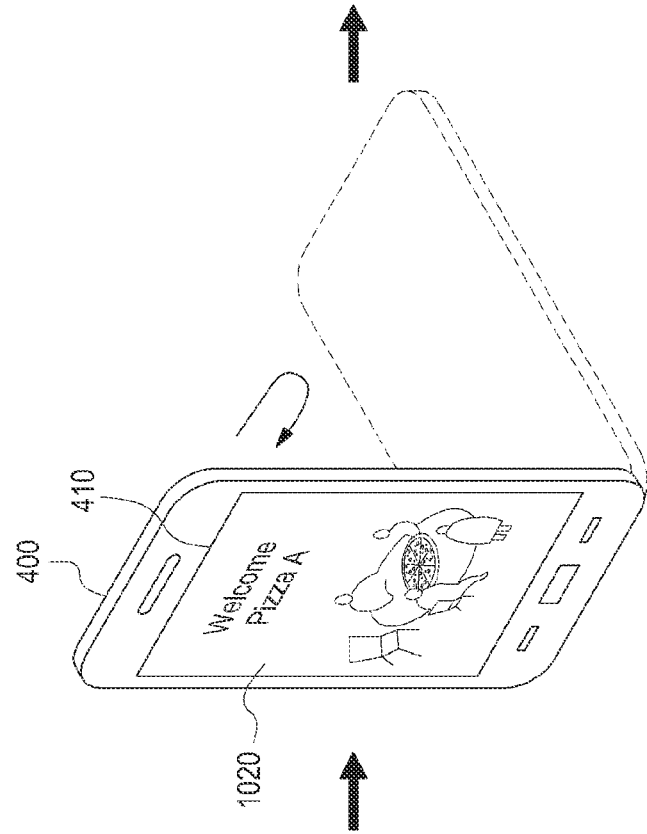
Figure 15C:
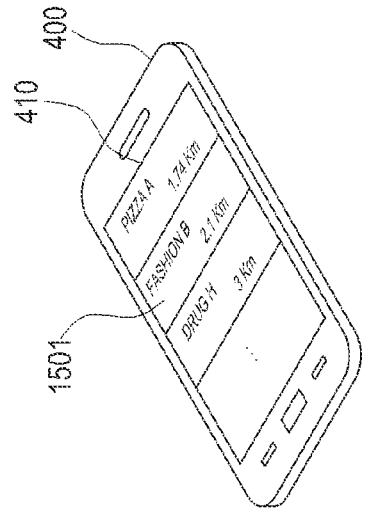

FIGS. 15A to 15C illustrate a method of changing screens according to an exemplary embodiment of the present invention.

Referring to FIG. 15A, the mobile communication terminal 400 may display a prior screen 1501 on the touch screen 410. The prior screen 1501 may be a screen of particular search results. For example, the user may enter a request to the mobile communication terminal 400 to search shops (e.g., places of interest) around (e.g., within a predefined or specified proximity to) the user. The mobile communication terminal 400 forwards the request to a server, and thereafter receives search corresponding results from the server. The mobile communication terminal 400 may then render the search results and display the prior screen 1501 of the search results. As illustrated in FIG. 15A, the prior screen 1501 corresponding to search results may be formed as a table having the search results arranged in a predetermined order (e.g., in an order based on the distance from the user).

Referring to FIG. 15B, the user may tilt the mobile communication terminal 400 with the prior screen 1501 corresponding to the search results being displayed. The mobile communication terminal 400 may then display the AR service screen 1020 in the order of the search results, corresponding to the tilting motion. In the exemplary embodiment of the present invention illustrated in FIG. 15B, the indoor image of the building "Pizza A" is displayed first because "Pizza A" is the first listed item in the search results of the prior screen 1501.

Referring to FIG. 15C, the user may conduct first and second tilting motions with the mobile communication terminal, as explained in relation to FIGS. 14A and 14B. As illustrated in FIG. 15C, according to exemplary embodiments of the present invention, the mobile communication terminal 400 may display the indoor image 1410 of the building "FASHION B", which corresponds to the next item (e.g., place) in the order of the search results.

Those indoor images are by way of example only, and the mobile communication terminal 400 may change and display various screens in the order of the search results, such as route information, three dimensional aerial views, external images of surrounding buildings, and the like.

According to exemplary embodiments of the present invention, the user may tilt the mobile communication terminal 400 after selecting one of the search results, such as "FASHION B". In this case, the mobile communication terminal 400 may first display the indoor image of the building "FASHION B" selected by the user. Thereafter, if the user conducts first and second tilting motions, the mobile communication terminal 400 may change and display the indoor image of the building "FASHION B" to an indoor image of a surrounding building "DRUG H", which is on the place next to the "FASHION B" in the order of the search results.

According to exemplary embodiments of the present invention, the mobile communication terminal may be controlled by the controller such that the controller operatively controls detection of the predetermine event and the changing of screens displayed on the touch screen. Detection of tiling of the mobile communication terminal may be performed by the sensor unit that includes rotation sensor, the gyro sensor, or the linear sensor. The sensor unit and the microphone may be collectively called an event detector.

It will be appreciated that the exemplary embodiments of the present invention may be implemented in a form of hardware, software, or a combination of hardware and software. The software may be stored as program instructions or computer readable codes executable on the processor on a non-transient computer-readable medium. Examples of the non-transient computer readable recording medium include magnetic storage media (e.g., ROM, floppy disks, hard disks, and the like), and optical recording media (e.g., CD-ROMs, or DVDs). The non-transient computer readable recording medium can also be distributed over network coupled computer systems so that the computer readable code is stored and executed in a distributed fashion. This media can be read by the computer, stored in the memory, and executed by the processor. Exemplary embodiments of the present invention may be implemented by a computer or portable terminal including a controller and a memory, and the memory may be an example of the non-transient computer readable recording medium suitable for storing a program or programs having instructions that implement the exemplary embodiments of the present invention. The exemplary embodiments of the present invention may be implemented by a program having codes for embodying the apparatus and method described in claims, the program being stored in a machine (or computer) readable storage medium.

The mobile communication terminal may receive the program from a program provider wired/wirelessly connected thereto, and store the program. The program provider may include a memory for storing programs having instructions to perform the exemplary embodiments of the present invention, information necessary for the exemplary embodiments of the present invention, and the like, a communication unit for wired/wirelessly communicating with a mobile communication terminal, and a controller for sending the program to the mobile communication terminal on request or automatically.

According to exemplary embodiments of the present invention, a mobile communication terminal for providing an Augmented Reality (AR) service more intuitively and method of changing into an AR service screen is provided. In particular, a simple motion with the mobile communication terminal may result in the mobile communication terminal to make a change from an arbitrary screen other than a start screen (e.g., a prior screen) to an AR screen, thereby maximizing user convenience.

While the invention has been shown and described with reference to certain exemplary embodiments thereof, it will be understood by those skilled in the art that various changes in form and details may be made therein without departing from the spirit and scope of the invention as defined by the appended claims but the equivalents.

What is claimed is:

1. A method of changing into a screen of an Augmented Reality (AR) service in a mobile communication terminal including a camera, the method comprising:
   displaying, on a touch screen of the mobile communication terminal, an application execution screen different from an AR service screen;
   detecting a predetermined event for displaying the AR service screen;
   driving the camera if the predetermined event has been detected, after the displaying of the application execution screen and the detecting of the predetermined event;
   capturing an image using the camera; and
   displaying the AR service screen rendered based on the image captured by the camera on a first area of the touch screen and displaying at least part of the application execution screen on a second area of the touch screen,
   wherein the first area and the second area do not overlap each other.

2. The method of claim 1, wherein the predetermined event corresponds to:
   a predefined voice input that instructs the mobile communication terminal to change display to the AR service screen.

3. The method of claim 1, wherein the AR service screen corresponds to an indoor image of a surrounding building of the mobile communication terminal.

4. A non-transient computer-readable storage medium storing instructions, that when executed, cause at least one processor to perform the method of claim 1.

5. The method of claim 1, wherein the predetermined event is a dragging motion downward from a top side of the touch screen.

6. The method of claim 5, wherein a size of the first area and a size of the second area are determined according to a position of the dragging motion.

7. A mobile communication terminal for providing an Augmented Reality (AR) service, the mobile communication terminal comprising:
   a camera:
   a touch screen configured to display an application execution screen different from an AR service screen;
   an event detector configured to detect a predetermined event for displaying the AR service screen; and
   a controller configured to:
      drive the camera if the predetermined event has been detected, after the displaying of the application execution screen and the detecting of the predetermined event,
      capture an image using the camera, and
      control the touch screen to display the AR service screen rendered based on the image captured by the camera on a first area of the touch screen and display at least part of the application execution screen on a second area of the touch screen, wherein the first area and the second area do not overlap each other.

8. The mobile communication terminal of claim 7, further comprising:
a microphone configured to receive a voice input,
wherein the predetermined event corresponds to a predefined voice input that instructs the mobile communication terminal to change display to the AR service screen.

9. The mobile communication terminal of claim 7, wherein the AR service screen is an indoor image of a surrounding building of the mobile communication terminal.

10. The mobile communication terminal of claim 7, wherein the predetermined event is a dragging motion downward from a top side of the touch screen.

11. The mobile communication terminal of claim 10, wherein the controller is further configured to determine a size of the first area and a size of the second area according to a position of the dragging motion.

* * * * *